United States Patent Office 3,428,218
Patented Feb. 18, 1969

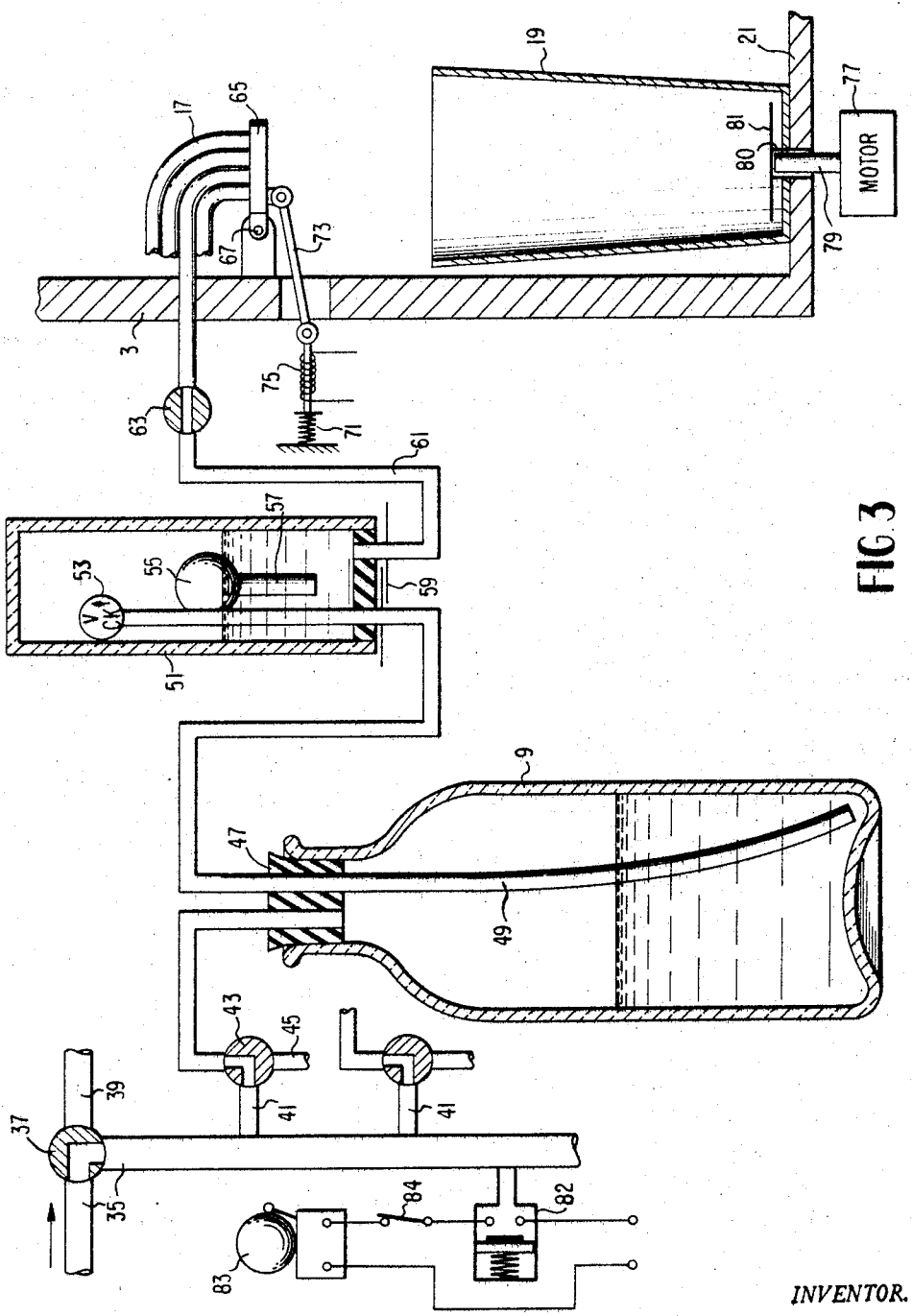

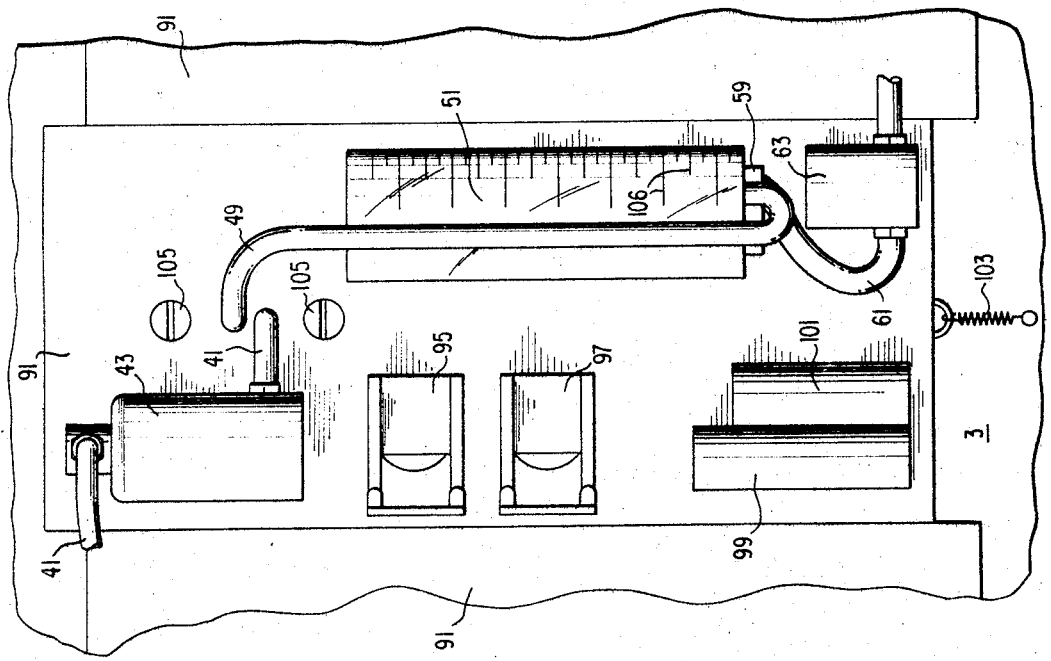
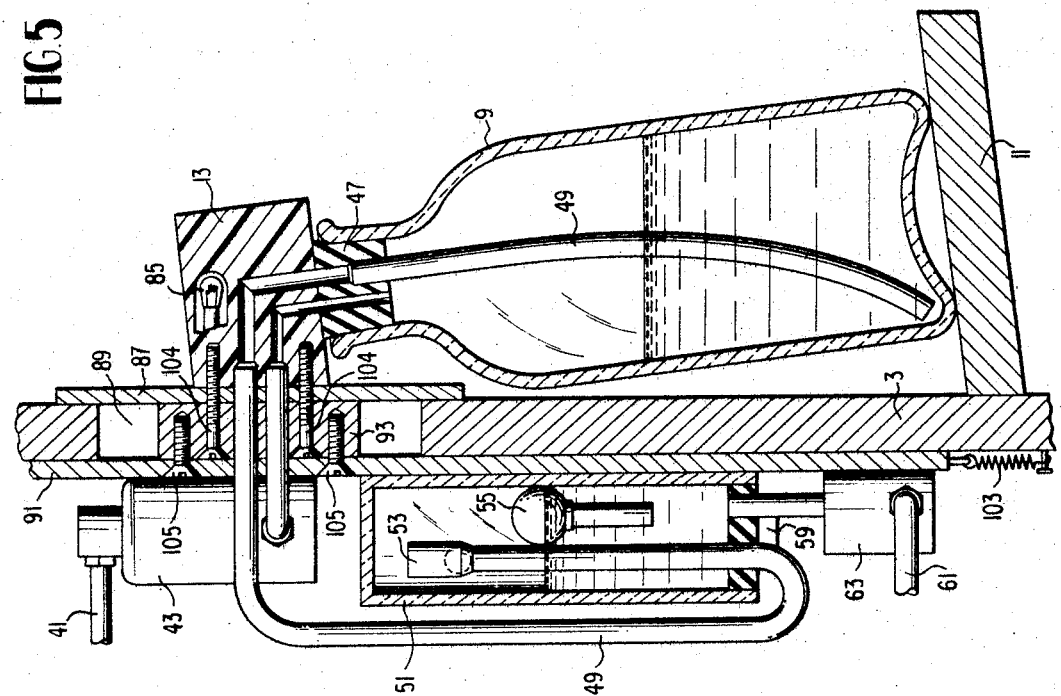

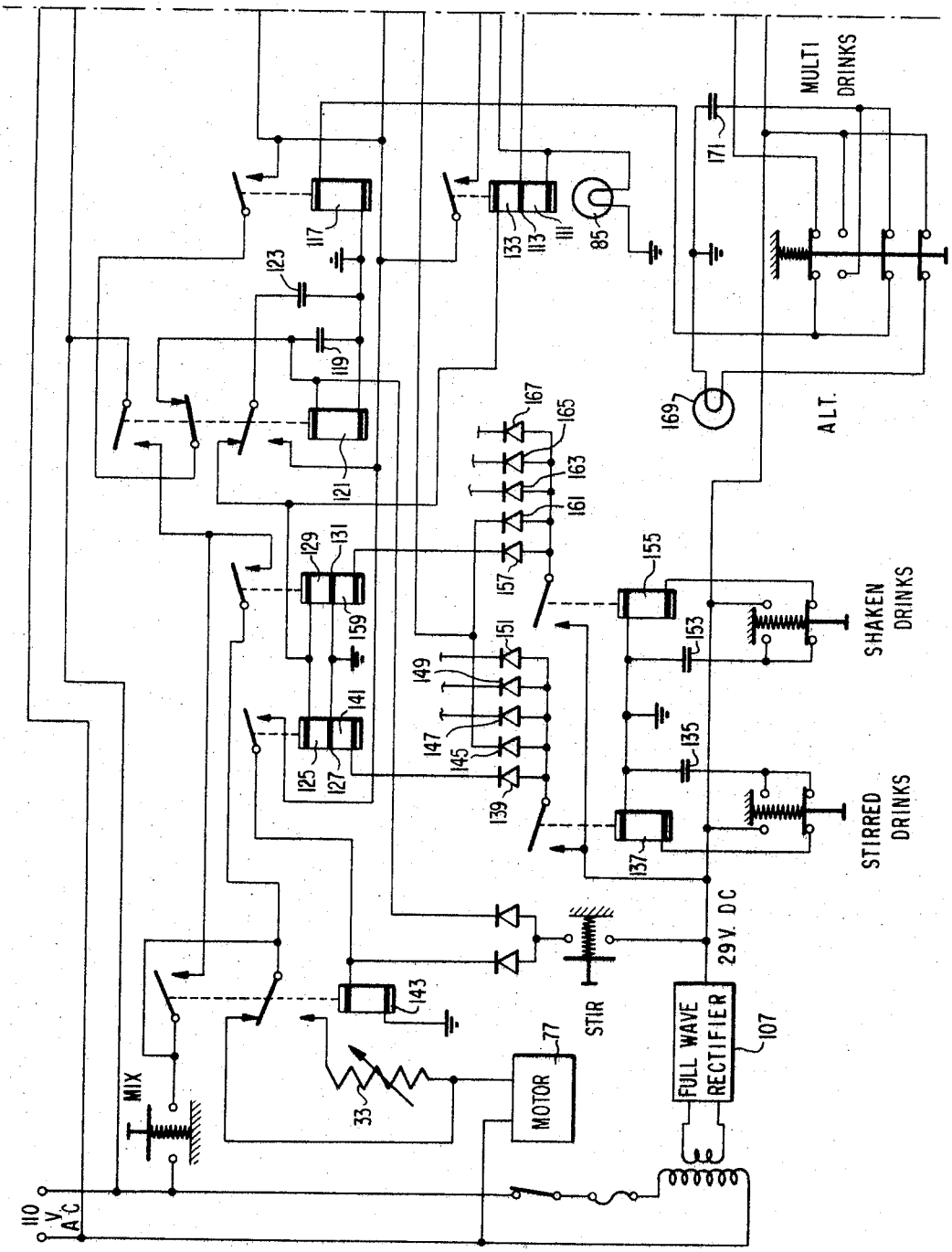

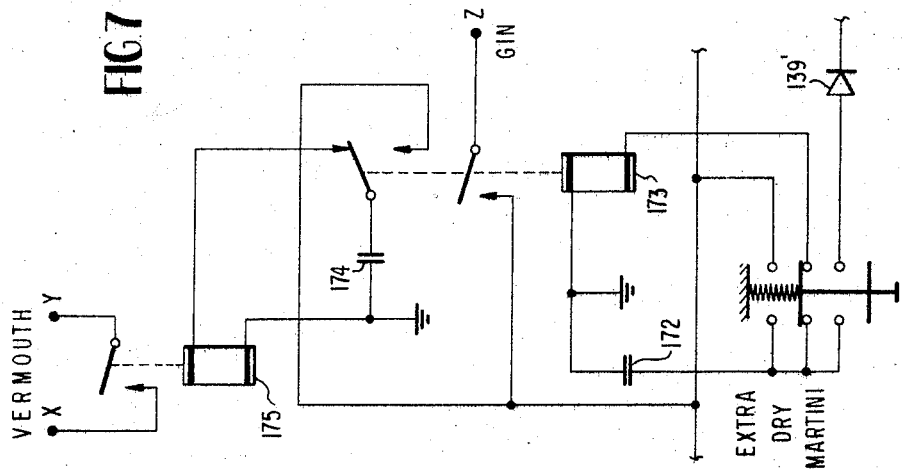
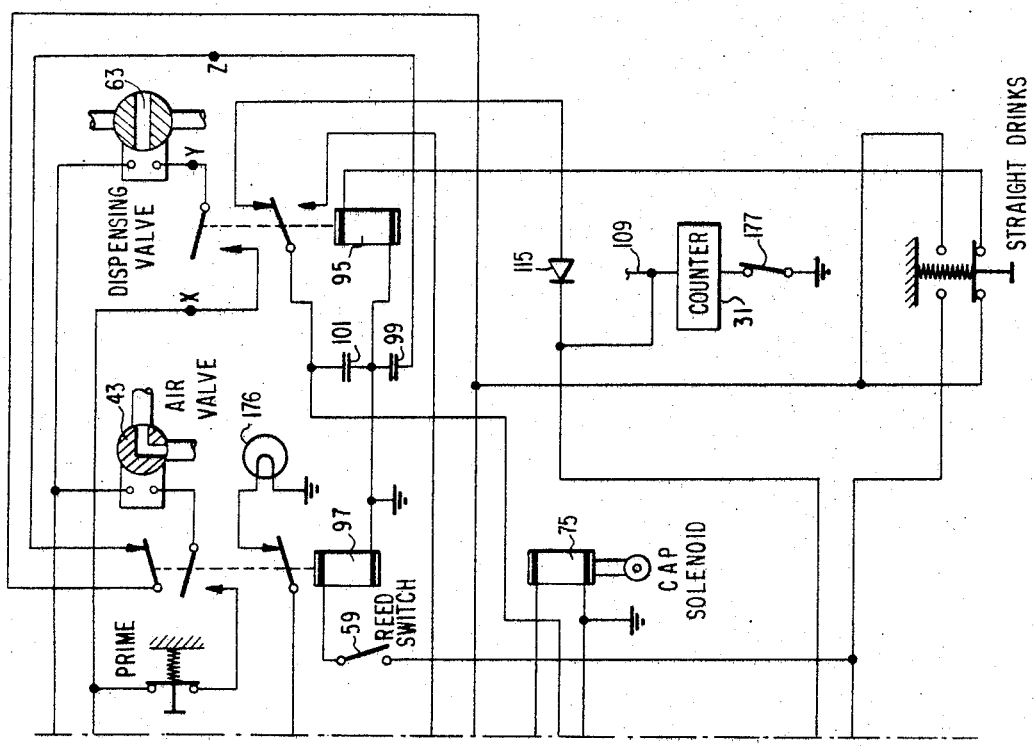

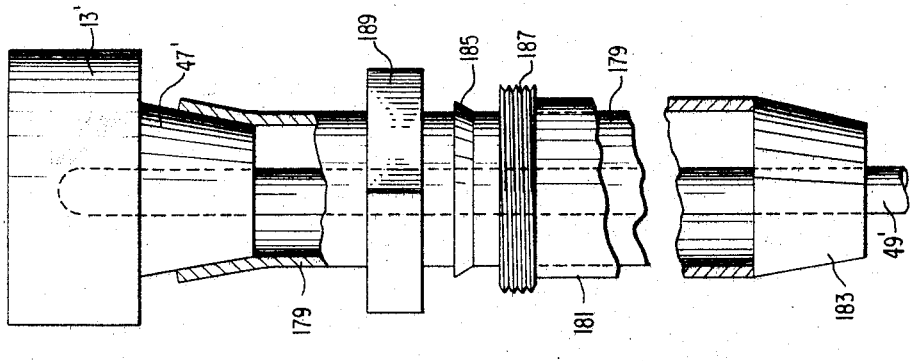
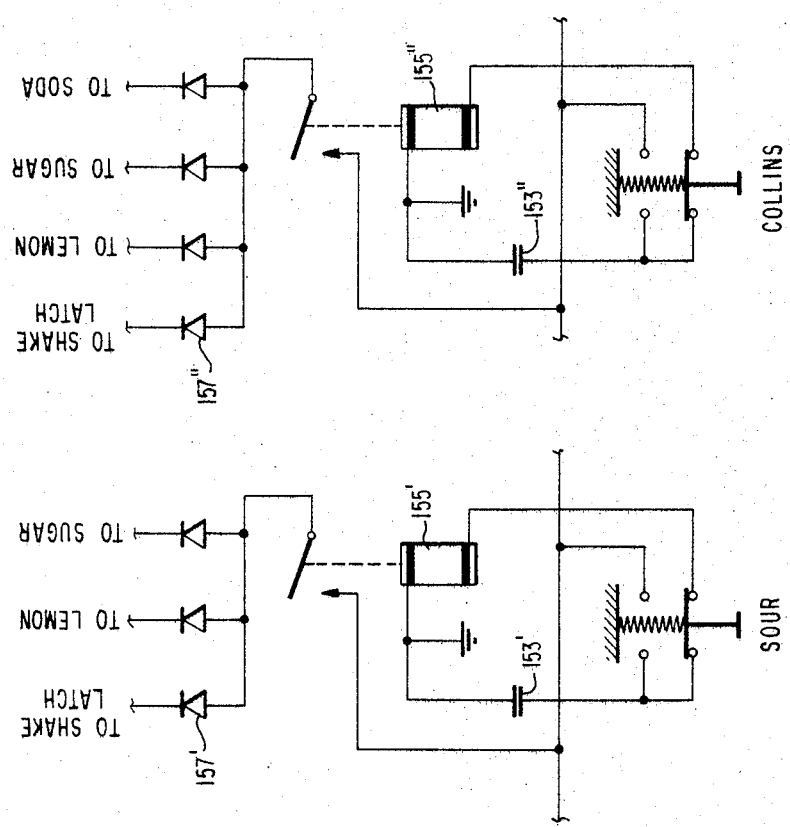

3,428,218
LIQUID DISPENSER
Felix V. Coja, 1523 22nd St., NW.,
Washington, D.C. 20037
Continuation-in-part of application Ser. No. 444,080,
Mar. 30, 1965, now Patent No. 3,305,132. This application May 12, 1966, Ser. No. 549,706
U.S. Cl. 222—23                                11 Claims
Int. Cl. B67d 5/10, 5/38

ABSTRACT OF THE DISCLOSURE

A dispenser for plural, mixed, alcoholic or non-alcoholic beverages, from the original bottles. A plurality of push buttons controls the sequence and amount of each ingredient. A separate push bottom controls a motorized mixer. A means to ensure a full serving of each ingredient is also provided.

---

The present application is a continuation-in-part of my copending application Ser. No. 444,080, filed Mar. 20, 1965, now Patent No. 3,305,132 of Feb. 21, 1967.

This invention relates to liquid dispensers, particularly of the type adapted to dispense plural liquids simultaneously or sequentially, and more particularly of the type adapted to dispense plural beverages some of which are alcoholic and others of which are nonalcoholic.

In the specification that follows, the present invention will be described and illustrated in connection with bartending. It is to be understood, however, that the invention in many of its aspects is also applicable to other fields of liquid dispensing such as the dispensing and mixing of pharmaceuticals.

Bartending is a science, not an art. Although a bartender performs a large number of operations, each particular operation is or should be identical each time he performs it. This is important, not only so that drinks will be of uniformly high quality, but also so that the more expensive ingredients of drinks will not be wasted.

Furthermore, the more complicated tasks performed by a bardender can be reduced to a relatively small number of unit operations. Thus, although a bartender must be capable of performing many different tasks, a large number of these tasks are simply various combinations of a relatively small number of simple operations.

At least in theory, therefore, it should be possible to device an apparatus which will automate bartending. Such an apparatus would perform simple operations as such, and would also perform more complicated tasks as simultaneous or sequential combinations of simple operations.

And in fact, a number of attempts have been made to produce apparatus which would dispense plural liquids selectively simultaneously and/or sequentially. Until the advent of the present invention, however, such apparatus suffered from a number of disadvantages. For example, when such apparatus attempted to dispense liquids from a plurality of bottles, there was no easy and reliable way of knowing when the bottles were empty. Also, such prior apparatus would dispense only an incomplete serving of a beverage when the bottle became empty. Furthermore, known apparatus had no really reliable way of dispensing a plurality of services of the same beverage except by repeating the entire dispensing operation.

Furthermore, difficulty was encountred from evaporation of the liquids upon standing, with the result that the first serving of a beverage dispensed after the apparatus had stood idle would be incomplete. Also, earlier apparatus was not adapted to operate on bottles of a variety of sizes. Furthermore, such earlier apparatus was quite limited in the number and nature of mixed drinks that could be produced.

Earlier apparatus in this field did not make it possible quickly and easily to remove empty bottles and replace them with full bottles, nor to indicate from which bottle dispensing was taken place. Earlier apparatus was subject to considerable loss of liquid should any liquid conduit fail, and had no way of automatically varying the quantity of liquid that was dispensed from an individual bottle according to the nature of the order drink. Such apparatus also could not provide for reliable stirring or shaking of mixed drinks, according to the nature of the drink and according to the sequence in which its ingredients were added if they were not combined simultaneously.

Accordingly, it is an object of the present invention to provide liquid dispensing apparatus of the type in which liquids are dispensed from one or more of a plurality of containers, in which there is a clearly visible indication when a given container is empty.

Another object of the present invention is the provision of such apparatus which will dispense a full serving of liquid from a given container, even though the container becomes empty during the course of dispensing that serving.

Still another object of the present invention is the provision of such a dispenser which can operate in connection with any number of bottles of any of the ordinarily used sizes or shapes.

A further object of the present invention is the provision of such a dispenser which can dispense a plurality of identical beverages; and if the beverages are to be stirred or shaken, will perform the necessary agitation only at the end of the dispensing of the series.

It is also an object of the present invention to provide a beverage dispenser which can provide not only single shots but also mixed drinks at high speed.

It is also an object of the present invention to provide such a dispenser which can mix a sour or a collins from any of the available alcoholic liquids, and which will agitate the resulting mixed drink only at the appropriate time.

The present invention also provides such a dispenser which is protected from evaporation so that the first portion dispensed will be of the same size as subsequent portions.

The present invention also provides such a dispenser which automatically mixes the drink at high or low speed according to the nature of the drink.

The invention further provides such a dispenser in which, in addition to the automatic shake and stir mechanisms, there are manually operated shake and stir mechanisms for high or low speed agitation in situations not otherwise provided for.

The invention also provides such a dispenser in which a visual price indication and a printed price record are automatically made at the time of dispensing the beverage.

The present invention further comprises such a dispenser in which containers such as bottles can be quickly and easily changed when they become empty.

The invention also provides such a dispenser in which the customer receives an indication of the bottle from which an alcoholic liquid is being dispensed.

It is also an object of the invention to provide such a dispenser in which mixed liquids may be dispensed without contaminating the remaining stocks of the individual liquids.

It is a further object of the present invention to provide such a dispenser in which the bottles used are clearly visible to the customer and are in an upright position.

A very important object of the present invention is the provision of a beverage dispenser which will be so fast and easy to operate that a bartender will have more time to spend with the customers, and at the same time will be able to dispense more drinks per unit time.

Finally, it is an object of the present invention to provide such a liquid dispenser, which will be relatively simple and inexpensive to manufacture, easy to operate, adjust, maintain and repair, and rugged and durable in use.

Other objects and advantages of the present invention will become apparent from a consideration of the following description, taken in connection with the accompanying drawings, in which:

FIG. 3 is a schematic fluid circuit diagram of the present invention;

FIG. 4 is an enlarged side cross-sectional view of a unit for dispensing liquid from a given bottle;

FIG. 5 is a view taken from the left of FIG. 4, that is, from the rear of the apparatus;

FIGS. 6a and 6b are sections of a schematic electric circuit diagram of the present invention;

FIG. 7 is a view similar to a portion of FIG. 6a, showing the characteristic portion of the circuit that dispenses altered quantities of gin and vermouth in the mixing of an extra dry martini;

FIG. 8 is a view similar to FIG. 7, but showing the characteristic portion of the circuit which dispenses the mix used for making a sour with any desired alcoholic liquid;

FIG. 9 is a view similar to FIG. 7, but indicating the characteristic fragment of the circuit for dispensing collins mix; and FIG. 10 is an elevational view, with parts broken away, of an adapter to enable use of the present invention with bottles of any desired size.

It should be definitely understood at the outset that the present invention does not eliminate bartenders. On the contrary, this invention makes the services of bartenders all the more valuable, because it relieves bartenders from the necessity of performing those monotonous and repetitious chores that can better be performed by machine, and enables the bartender to have more time for those very important social contacts with the customers, that will never be performed by machine.

Figure 1:
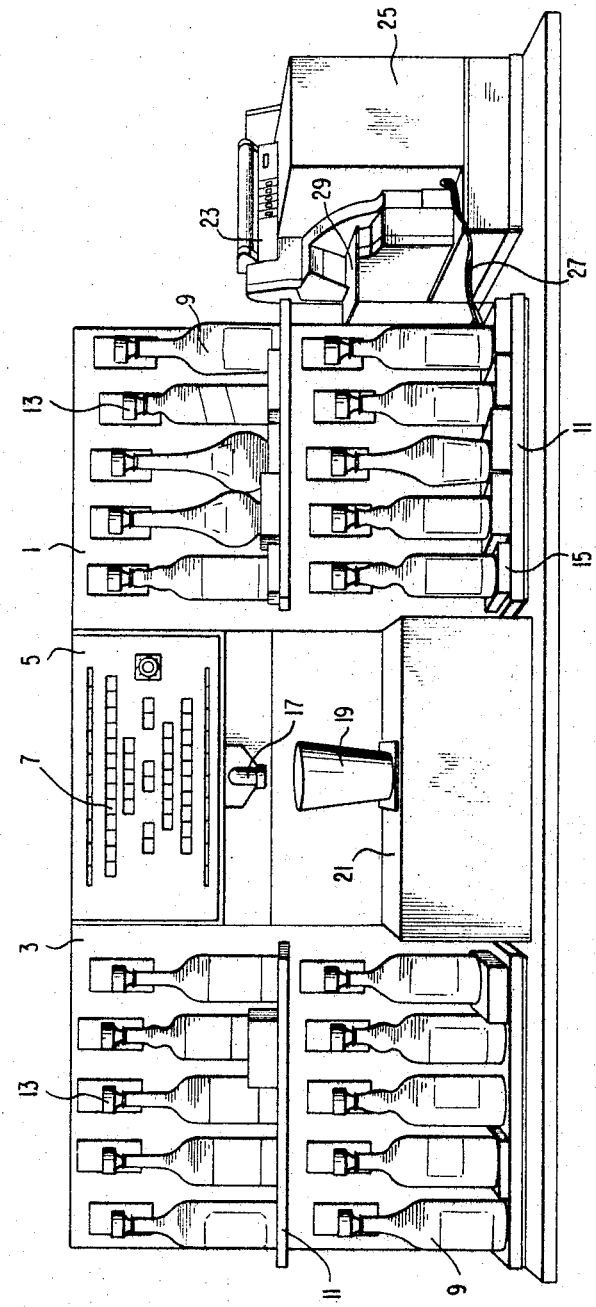
FIG. 1 is a front perspective view of a beverage dispenser according to the present invention.

Referring now to the drawings in greater detail, a bird's-eye picture of the present invention can be gained from an inspection of FIG. 1.

In FIG. 1, the front of a beverage dispenser according to the present invention is shown, in the form of a cabinet 1 having a main upright panel 3. Centered in cabinet 1 is an upright control panel 5 having a number of push buttons 7 thereon accessible to the bartender.

The manipulation of the buttons 7 individually, or simultaneously or sequentially in various combinations, causes liquids to be dispensed from a plurality of sources, including any desired number of bottles 9 of alcoholic beverages such as whiskey, rum, vodka, gin, liqueurs, brandies, etc. The bottles 9 rest on shelves 11 which are tilted forwardly upwardly so as to retain the bottles more securely in place and to ensure complete emptying of the bottle. Each bottle 9 is retained on its shelf 11 by one of a plurality of heads 13, one of which is individual to each bottle 9 and each of which is mounted for individual vertical reciprocatory movement on and relative to panel 3, for the purpose of disengaging it from and engaging it with the bottles 9. The vertical reciprocatory movement of heads 13 also permits their engagement with bottles of somewhat different heights. If desired, however, blocks 15 of appropriate height may be inserted under bottles 9 so as to adapt shorter bottles to the associated heads 13. In addition, special adapter means may be provided as will be described later, for this same purpose.

In the center of the front of panel 3 is an outlet 17 through which plural liquids may be sequentially or simultaneously dispensed. The liquids fall into a container 19 beneath outlet 17, which is supported on a shelf 21. The container 19 is of known mixing type, in which an agitator is rotatable within the container and a spindle protrudes up from shelf 21 to rotate the agitator of container 19 under the impetus of a motor housed beneath shelf 21, as will be disclosed in greater detail later on.

The operation of the dispenser of the present invention is also tied to that of a cash register 23. Register 23 is provided with a pricing unit 25 by which the keys of the register are selectively operable under the influence of the transaction being performed by the dispenser. Such a pricing unit is described in greater detail in my Patent No. 3,227,367, Jan. 4, 1966, to which reference is made so as to avoid the inclusion of unnecessary disclosure in the present application. Pricing unit 25 is in electrical connection with the circuit of the dispenser through wires 27; and the operation of register 23 under the influence of pricing unit 25 and the present dispenser results in the giving of a visual indication of unit price and/or total accrued price of a plurality of drinks, and also the printing of corresponding indicia at a printing station 29 of the register. In other words, when the dispenser of the present invention dispenses a beverage for which a charge is made, the price of that beverage and/or of the series of beverages of which that beverage is a member, is automatically recorded and indicated on register 23.

The present invention will now be described in greater detail, in four stages. In the first stage, the operation will be described as it would be viewed by the customer. In the second stage, the fluid circuit diagram will be disclosed. In the third stage, the apparatus for effecting that operation will be described; and in the fourth stage, the electric circuit diagram will be traced.

The operations performed by the bartender on the control panel 5 and visible to the customer will now be described in connection with FIG. 2.

It should be understood that the buttons 7 are themselves small panels which are of a light-transmissive substance such as plastic, and are provided with lights behind them to show the condition of that portion of the apparatus which they represent. In the normal condition of the apparatus, all of the buttons 7 will be lit. Most of the buttons, and in fact all of them except those designated "prime," "multi drinks," "mix" and "stir," refer to a liquid combination of liquids to be dispersed. The lit condition of each button means that the associated bottle or bottles are in position in the machine and that some liquid is left in the bottle and that the fluid circuit relating to that bottle is primed, that is, there is enough liquid in that fluid circuit to dispense a full drink, regardless of whether there remains a full portion in the bottle. However, the light of the button goes out at the same time the bottle becomes empty.

Thus, to dispense for example a single unmixed drink, the bartender holds an appropriate glass beneath outlet 17 and pushes the button associated with that drink. Let it be assumed that he pushes "gin." Unless the gin bottle is emptied by that operation, the "gin" button will stay lit, and in addition the head 13 above the gin bottle 9 will light up, indicating the bottle from which the drink is being dispensed. A predetermined portion of gin will flow through outlet 17 and into the glass; and at the same time, the register 23 will be operated by pricing unit 25, so that a visible indication of the price of a single portion of gin will appear on the register, and the same price will be printed on a slip or sales check in the printing station 29 of the register.

But if the gin bottle becomes empty while the portion is being dispensed, then the light of the "gin" button goes out and the lights of all the mixed drinks also go out. However, a full portion is nevertheless dispensed. Should the bartender thereafter push the unlighted "gin" button, or any mixed drink button, nothing would happen: no liquid would be dispensed and the register would not be operated. In this way, the customer cannot be charged for a drink that he does not get and can only be charged for a full drink.

The fact that the gin bottle is empty will stand out, because the "gin" button will be the only unlighted unmixed drink button on the panel. The buttons 7 are symmetrically arranged, and a dark button readily calls attention to itself.

To replace the empty gin bottle, the bartender simply raises the head 13 and slips out the empty bottle and slips in an open full bottle in its place. He then lets the head 13 go back down on the bottle, so that head 13 seals against the bottle.

But the "gin" button remains drak. To light the "gin" button and place the apparatus in condition to resume dispensing, the bartender presses the "prime" button. This replenishes the gin circuit with at least one full portion of gin, it being remembered that a full portion of gin is maintained in the gin-dispensing fluid circuit even just before the last portion of gin is dispensed, that is, when the gin bottle is not empty but there is less than a full portion of gin in the bottle itself. The flow of liquid is caused by a gas such as air or carbon dioxide under pressure, the apparatus of the present invention being a pressurized system; and priming is completed when the necessary quantity of gin has been forced by gas pressure from the new gin bottle into the gin-dispensing fluid circuit. Thereupon, the "gin" button 7 lights up as do the mixed drink buttons, and the operator knows that the dispensing of any drink requiring gin can resume.

Turning now from straight portions to mixed drinks, let it be assumed that the customer calls for a martini. The bartender places container 19 on shelf 21 and pushes the "martini" button, whereupon the heads 13 of the gin and dry vermouth bottles light up, and a certain quantityt of gin and a smaller quantity of dry vermouth are simultaneously dispensed from head 13 into container 19. After this dispensing, the motor beneath shelf 21 operates automatically at low speed to stir the drink for a short period of time and then automatically stops. The bartender can then remove container 19 and pour out the completed martini.

If the customer calls for an extra dry martini, then the bartender pushes the "ex. dry martini" button, and the same thing happens as before except that the quantity of gin is larger and the quantity of dry vermouth is smaller, but the total quantity of liquid is the same as in the case of a regular martini. The apparatus thus automatically changes the proportions of the same alcoholic liquids, depending on the nature of the drink.

If the drink is of the type that is ordinarily shaken vigorously, instead of merely stirred, then the apparatus also can produce this type of drink. For example, if the customer calls for a Singapore sling, the bartender pushes the "Singapore sling" button and there are dispensed simultaneously gin, cherry brandy, "lemon" (lemon juice, full strength or diluted), "sugar" (sugar syrup) and "soda" (carbonated water). When the dispensing is completed, the motor beneath shelf 21 operates at high speed to stir the dring so vigorously as to produce a finished drink having the characteristics of a thorougly shaken drink, and which in fact will have a desirably long-lasting foam.

If multiple mixed drinks are called for, that is, a plurality of identical mixed drinks to be received together in container 19 and dispensed one by one from container 19, then it is desirable that they be mixed only once, after they are all in container 19. To produce plural mixed drinks, therefore, the bartender pushes the "multi drinks" button, the light of which thereupon goes out. He then pushes the desired mixed drink button and dispenses the liquid components of the desired drink as many times as the order requires. The "multi drinks" button remains unlit. When all of the mixed drinks have been dispensed into container 19, he pushes the "multi drinks" button again, which lights up and the motor operates to stir or shake the drinks at a speed appropriate to the nature of the drink. Register 23 records and indicates the dispensing of each individual drink at the same time it is dispensed.

A sour or a collins can be made form any of the bottles on the front of the machine. If the customer calls for a Scotch sour, for example, the bartender pushes the "sour" button, and lemon and sugar are simultaneously dispensed into container 19 but are not agitated. Thereafter the bartender pushes the "Scotch" button and a portion of Scotch is dispensed into container 19 and the motor thereafter automatically operates at high speed to agitate the mixture to complete a Scotch sour. The motor does not operate until after the "Scotch" button has been pushed.

To dispense a collins, essentially the same operation is followed. The "collins" button is pressed and then the alcoholic button such as "gin." When the "collins" button is pressed, lemon, sugar and soda are dispensed; and when, say, the "gin" button is pressed, the gin is added, after which the mixture is mixed by vigorous stirring in the manner of a shaken drink.

The present invention is also adapted to make beverages other than those on the buttons. To this end, manual "mix" and "stir" buttons are provided, for the manual as distinguished from the automatic operation of the motor at high and low speeds, respectively. For example, if a "Black Russian" were ordered, then the "vodka" button would be pressed to dispense a portion of vodka and the "coffee liqueur" button would be pressed to dispense a portion of coffee liqueur, after which the "stir" button would be pressed and held for an appropriate time, to stir the contents in container 19 at low speed. Similarly, exotic mixed drinks can be made with any combination of ingredients, simply by pressing the individual ingredient buttons and then pressing the "mix" or "stir" button for agitation of the mixture.

Figure 2:
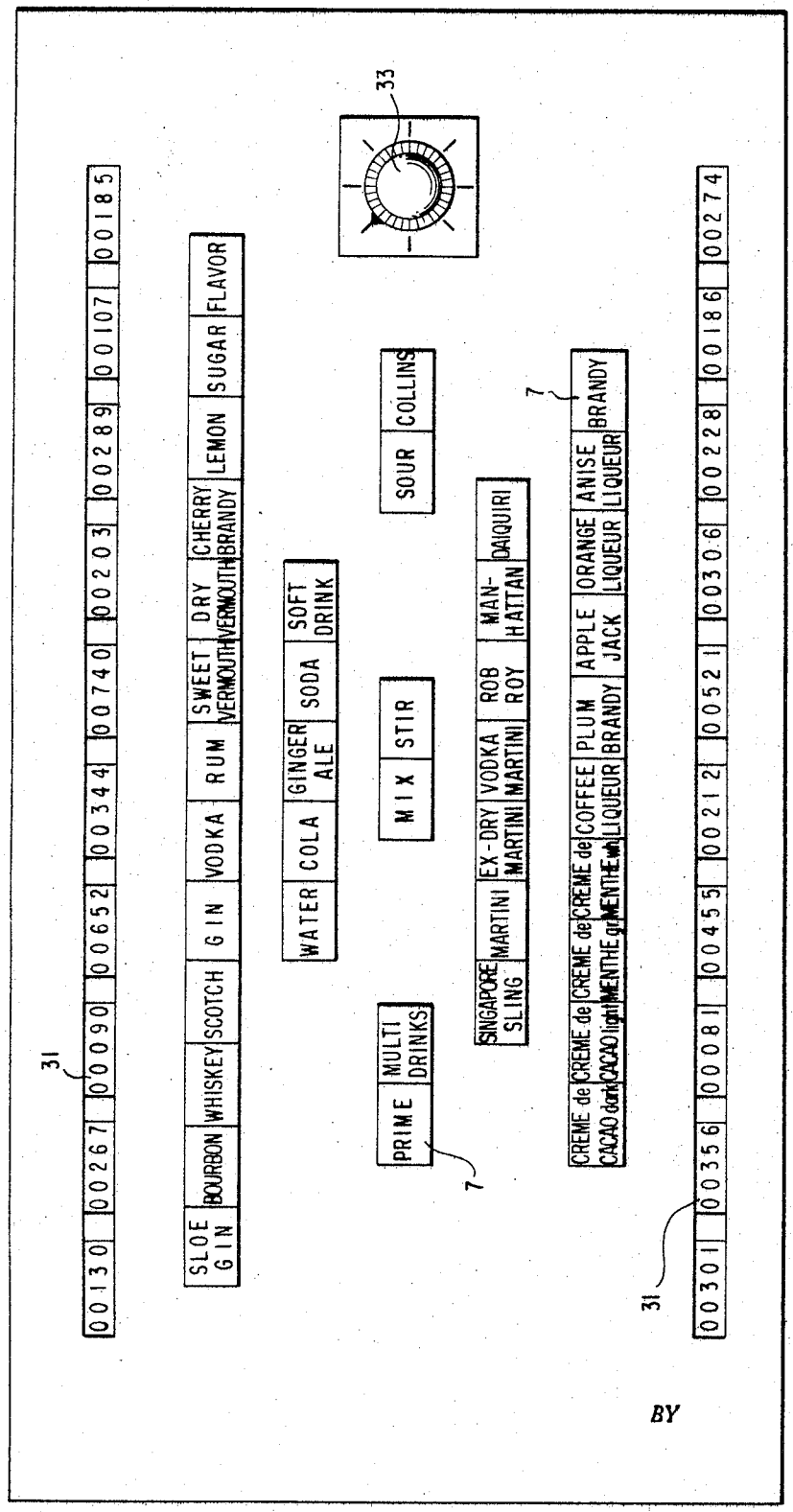
FIG. 2 is an enlarged elevational view of the control panel of the beverage dispenser of FIG. 1.

Before leaving FIG. 2, it should be noted that a plurality of counters 31 are provided, one individual to each dispensed alcoholic liquid, for keeping a running tally of the number of times a drink containing that liquid has been dispensed. Control panel 5 also presents to the bartender a speed control 33 by which the low speed of the motor can be regulated.

Turning now to FIG. 3, the overall fluid flow diagram will be seen by which many of the above functions can be carried out. In FIG. 3, gas such as air or carbon dioxide under pressure is supplied by a main supply conduit 35. The conduit 35 can be quickly depressurized by manipulating a panic valve 37, which allows the pressure of the entire system to escape through a conduit 39. This is useful in case a leak develops, whereupon the panic valve 37 is operated to depressurize the entire system immediately until the source of the leak can be found and corrected.

Branched from conduit 35 downstream from valve 37 are a number of conduits 41 each of which is controlled by a valve 43 by which pressure in an individual bottle 9 can be selectively established through conduit 41, or exhausted through a conduit 45. Conduit 41 supplies gas under pressure to an individual bottle 9 through an opening in an apertured stopper 47 which in practice will be carried by head 13.

The liquid in the bottle 9 is forced by the gas pressure to leave through a conduit 49 and is passed through stopper 47 into a float chamber 51, which it enters through a check valve 53 spaced a substantial distance above the bottom of float chamber 51. Float chamber 51 contains a float 55 which carries on its underside a magnet 57. The level of liquid in float chamber 51 will maintain magnet 57 spaced a substantial distance above the bottom of the float chamber so long as there is liquid in bottle 9. But when bottle 9 is empty and float chamber 51 thus cannot be replenished, then float 55 will drop upon the dispensing of further drinks until magnet 57 closes a reed switch 59 carried by the underside of float chamber 51. When reed switch 59 closes, then the light behind the button 7 corresponding to the empty bottle 9 goes out, as well as the lights behind all the mixed drink buttons if the depleted liquid is an ingredient of any mixed drink, and the dispensing mechanism for the empty bottle 9 or any mixed drink cannot be actuated after completion of dispensing the drink that emptied the bottle. However, when magnet 57 closes reed switch 59, there is a full drink in float chamber 51, so that even if bottle 9 empties at the very beginning of the dispensing of the last drink, a full drink will still be dispensed.

The closing of reed switch 59 also actuates valve 43 to reduce the pressure in bottle 9 to atmospheric. Check valve 53 closes, thereby maintaining enough pressure in float chamber 51 to complete the dispensing of the drink that emptied the bottle.

The liquid dispensed from float chamber 51 leaves through a conduit 61 which is controlled by a valve 63, and proceeds to and leaves through outlet 17. Outlet 17 is in fact the terminus of a plurality of conduits 61 that are brought together in a bundle for this purpose.

At least one full drink of each alcoholic liquid remains in float chamber 51 between drinks, and it is quite acceptable to leave it there overnight. The next day the first drink dispensed will be what was stored in the float chamber overnight. As the alcoholic liquids may be volatile, it is desirable to minimize evaporation of the liquid in the conduit 61 downstream of valve 63, so that after a long period of inactivity the first drink will be a full drink. To this end, there is provided a vertically swinging cap 65 which conjointly opens and closes all of the conduits 61 that make up outlet 17. Cap 65 is mounted for vertical swinging movement about a pivot 67 on panel 3. Cap 65 is continuously yieldably urged toward its closing position by a coil compression spring 71. A linkage 73 interconnects cap 65 pivotably with the core of a solenoid 75 which opens cap 65 when energized by swinging it down and closes cap 65 when deenergized by permitting it to swing back up under the urging of spring 71 which bears against the solenoid core. Cap 65 remains closed between drinks and is opened substantially only when liquid is being dispensed from outlet 17. The purpose of cap 65 is accordingly not to prevent drip but rather to prevent evaporation. It does not keep the liquid in: it keeps the gas out.

FIG. 3 also shows the relationship of container 19 to the motor 77 beneath shelf 21. Motor 77 has an upstanding drive shaft 79 that has a noncircular upper end that fits within a mating sleeve 80 rotatably carried by the bottom of container 19.

Sleeve 80 in turn carries a rotor 81 to agitate the liquid. Rotor 81 can be of any of a variety of configurations, in order to produce the desired stirring characteristics at low motor speed and mixing or shaking characteristics at high motor speed.

A burglar alarm is provided, to prevent the unauthorized removal of a bottle containing liquid. As can be seen from the left of FIG. 3, a pressure-responsive switch 82 is in fluid circuit with conduit 35 downstream of valve 37, and is in series electrically with an audible alarm 83. When the pressure in conduit 35 drops upon unauthorized removal of a bottle, switch 82 closes and sounds alarm 83. Alarm 83 may be deactivated by an authorized person, by opening switch 84 to permit legitimate depressurizing of conduit 35.

Some of the unique structure by which these functions can be carried out is shown in FIGS. 4 and 5. In FIG. 4, it will be noted that stopper 47 is secured to the underside of head 13, and that the head 13 may be of a transparent or translucent plastic material, such that a light 85 can illuminate it when liquid is being dispensed from the associated bottle 9. Head 13 is carried by a plate 87 that slides on the front of panel 3 and that covers a vertical slot 89 that extends through panel 3. A larger vertically disposed plate 91 is slidably disposed on the rear of panel 3. Plates 87 and 91 are interconnected by a spacer 93.

It will also be noted from FIG. 4 that conduit 49 within bottle 9 is curved and extends into the lowermost corner of bottle 9. This curvature of conduit 49 takes advantage of the tilt of shelf 11 to ensure emptying of the bottle.

Valve 43, float chamber 51, and valve 63 are mounted on the back of plate 91. Also mounted on the back of plate 91 are relays 95 and 97 and capacitors 99 and 101, which are associated with the operation of valves 43 and 63. The wires associated with relays and capacitors 95–101 are not shown in FIG. 5, in order to avoid a multitude of confusing lines.

Head 13 thus comprises a unitary assembly that extends in front of and behind the panel 3 and is vertically slidable on and relative to panel 3, and is continuously urged downwardly not only by its own weight but also by a coil tension spring 103. It is thus possible to avoid relative movement between the parts mounted on a given plate 91, and each plate 91 will accordingly carry a group of associated units which can be quickly and easily detached from the rest of the machine for replacement or repair. To this end, screws 104 are provided which extend through spacer 93 and plate 87 and terminate in head 13; while screws 105 are provided which extend through plate 91 and terminate in spacer 93. To remove plate 91 and the parts mounted on it, it is necessary only to unscrew screws 105 and pull the electrical connecting plug (not shown), whereupon plate 91 can be removed from behind the machine, leaving spacer 93 and plate 87 and head 13 and bottle 9 on the front of panel 3. The connections of conduits 41 and 49 through spacer 93 are of the quick detachable type, these conduits being for example of polyethylene or other deformable plastic material which can simply be pushed on or pulled off their pressure-tight connections. It is thus necessary to tolerate a minimum of flexing of the conduits, as everything on plate 91 moves as a unit, and then only during removal and replacement of empty bottles.

It is also noteworthy that the edges of plate 91 are vertical and slide against the edges of the adjacent plates 91, as seen in FIG. 5. This arrangement, and the securement of plate 91 to plate 87 through spacer 93, make it unnecessary to provide any other guide structure for the plates 91. They guide each other. The only modification of panel 93 which is necessary in order to receive a head assembly is thus to cut a slot 89 and to secure a spring 103. A simple and inexpensive structure is thus provided.

Finally, FIG. 5 shows the indicia 106 on float chamber 51, which make it easy to take inventory when float chamber 51 is of a transparent material such as glass or plastic.

In the light of all the foregoing, the characteristic features of the circuit diagram (FIGS. 6a and 6b) will now be appreciated. In FIGS. 6a and 6b (hereinafter called "FIG. 6"), it should first be pointed out that the seven push switches which are labeled correspond to buttons 7 on FIG. 2. The switches labeled "mix," "stir," "prime" and "multi drinks," in FIG. 6, correspond exactly to the similarly named buttons 7 in FIG. 2. The "straight drinks" switch of FIG. 6 corresponds to the first ten buttons of the top row in FIG. 2 and all of the buttons in the bottom row of FIG. 2. The "stirred drinks" and "shaken drinks" switches of FIG. 6 correspond to the mixed drinks which require respectively low speed or high speed stirring or mixing.

Let it first be assumed that a single portion of gin is to be dispensed. When the "gin" button is pressed, the corresponding "straight drink" switch is actuated. Current from a power source 107 flows to capacitor 99 to charge that capacitor. When the switch is released, it returns to the position shown in FIG. 6, whereupon capacitor 99 discharges through relay 95, energizing the relay until the charge of capacitor 99 is dissipated. Of course, capacitor 99, like the other capacitors to be described herein, is chosen so that its discharge period will have the desired predetermined duration in connection with its associated relay and the other characteristics of the circuit.

The energization of relay 95 charges capacitor 101, which during its discharge energizes the on-winding 111 of a latching relay 113. The energization of winding 111 causes the associated contacts to close, which in turn energizes the cap solenoid 75 which opens cap 65. At the same time, light 85 in head 13 is lit. Also, the solenoid-actuated dispensing valve 63 is opened.

Dispensing valve 63 remains open for as long as capacitor 99 discharges. Valve 63 is of the well-known type that is adjustable to vary the flow rate through it. Capacitor 99 is chosen to have a discharge period such that roughly the desired quantity of liquid will be dispensed. Valve 63 is then adjusted so that exactly the desired quantity of liquid will be dispensed. In other words, the selection of capacitor 99 provides a rough regulation of the quantity dispensed while the adjustment of valve 63 provides a fine regulation.

When capacitor 99 is discharged and relay 95 deenergized, it returns to the position shown in FIG. 6; dispensing valve 63 returns to its closed position, and capacitor 101 sends an impulse through diode 115 to a relay 117 and causes the contacts associated therewith to close and open, which in turn charges a capacitor 119, which discharges through relay 121 for a predetermined period. The impulse through diode 115 also goes to the associated counter 31 to actuate it one step, and goes through conductor 109 to pricing unit 25.

During the time relay 121 is energized, the circuit from power to capacitor 119 is opened, thereby preventing further impulses from reaching capacitor 119 during its discharge through relay 121. The energization of relay 121 charges capacitor 123.

Upon the deenergization of relay 121, capacitor 123 discharges through off-winding 125 of latching relay 127 and through off-winding 129 of latching relay 131, and also through off-winding 133 of latching relay 113. Relays 127 and 131 are in their normal off position and the current through their off-windings 125 and 129 accordingly does nothing. But relay 113 is latched on, and the current through off-winding 133 unlatches relay 113 and deenergizes cap solenoid 75, whereupon cap 65 closes.

To dispense a stirred drink, one of the stirred drinks buttons is pressed, which actuates the "stirred drinks" switch of FIG. 6. A capacitor 135 is charged; and when the "stirred drinks" switch is released, capacitor 135, which is of relatively small capacity, discharges by sending a brief impulse through relay 137. An impulse is thus sent through a bank of diodes. The impulse through the diode 139 energizes the on-winding 141 of latching relay 127; and this in turn energizes relay 143. The circuit through the speed control or variable resistor 33 and motor 77 is thus complete, except for one of the contacts of relay 121. However, an impulse from another diode 145 of the bank of diodes charges capacitor 99, whereupon the events consequent thereon take place as described above in connection with the straight drinks. In other words, the operation in connection with stirred drinks is similar to that in connection with straight drinks, except that diode 139 sets up the motor circuit including the variable resistor 33, so that when relay 121 is subsequently energized, the motor will be driven at low speed, and when relay 121 is thereafter deenergized, the motor will be stopped.

Of the remaining diodes of the bank of diodes associated with the "stirred drinks" switch, the diode 147 functions like diode 145 but sends its impulse to the circuit of a second ingredient of the stirred drink. Diode 149 sends its impulse to pricing unit 25, while a diode 151 can send its impulse to a counter 31 which is designed to count the number of stirred drinks of a given identity. It should be noted that the counter 31 to which diode 151 sends its impulse has no illustrated counterpart in FIG. 2, in which the counters 31 are associated only with straight drinks and count mixed drinks in terms of the straight drinks contained therein.

To dispense a shaken-type drink, the "shaken drinks" switch is actuated, which charges a small capacity capacitor 153; and upon release of the switch, capacitor 153 sends a brief impulse through a relay 155, which sends impulse to the bank of diodes associated with that relay. The diode 157 sends its impulse to the on-winding 159 of latching relay 131, which establishes a circuit through motor 77 but for the contacts associated with relay 121, this latter circuit by-passing the variable resistor 33. The diode 161 again sends its impulse to charge capacitor 99, with the above results; while diode 163 performs a similar function in connection with a second ingredient; diode 165 actuates pricing unit 25; and diode 167 may be used to count the shaken drinks although no corresponding counter 31 appears in FIG. 2.

To dispense "multi drinks," that is, multiple identical drinks which must be stirred or shaken, the "multi drinks" switch is actuated. This switch is of the alternate type, which is pressed and released once to move it away from the position shown in FIG. 6, and pressed and released again to return it to the position of FIG. 6. At the first push, the light 169 associated with the "multi drinks" switch goes out and stays out until the second actuation of the switch. Also, the circuit to diode 115 is opened, thereby preventing any signals from reaching the circuit of motor 77. Capictor 171 charges. In this condition, as many mixed drinks as desired can be dispensed without actuating motor 77. Upon returning the "multi drinks" switch to the position of FIG. 6, light 169 goes back on and capacitor 171 discharges through relay 117 as diode 115 did in the operations described above, with the results previously set forth. At this time, motor 77 operates to stir the drinks at low speed if the circuit is through variable resistor 33 or to mix them at high speed if the circuit by-passes 33.

FIG. 7 indicates a variant portion of the basic circuit of FIG. 6, which is needed in order to dispense drinks any of whose ingredients is present in a quantity different from the standard quantity. FIG. 7 is drawn in terms of extra dry martinis, in which it is desired to increase the gin and decrease the vermouth; but it will be understood that the principles shown therein are applicable to other liquids as well.

To understand FIG. 7, it must be kept in mind that the terminals X, Y and Z in FIG. 7 are to be connected at X, Y and Z in the upper right corner of FIG. 6b, but not in a single circuit. Instead, X and Y are connected at X and Y in the vermouth circuit, while Z is connected at Z in the gin circuit.

When the "ex. dry martini" switch is pushed, an impulse is sent through diode 139' through the on-winding 141 of latching relay 127, thereby setting up the motor circuit through the variable resistor 33 for low speed motor operation or stirring. At the same time, capacitor 172 (FIG. 7) is charged.

When the "ex. dry martini" button is released, capacitor 172, which is of substantial capacity, discharges through relay 173 for a predetermined period of time, thereby connecting Z to power. Gin capacitor 99 (FIG. 6) is charged, and at the same time gin relay 95 is energized, thereby opening gin-dispensing valve 63 for as long as capacitor 172 discharges. Also during the discharge of capacitor 172, capacitor 174 (FIG. 7) is being charged.

When capacitor 172 has discharged, relay 173 returns to its position shown in FIG. 7. Capacitor 174 then discharges through relay 175, which closes the circuit through the dispensing valve 63 for vermouth. In effect, the capacitor 174 and relay 175 are replacing the capacitor 99 and relay 95 in the standard circuit for vermouth; and 174 and 175 will accordingly be chosen so as to keep vermouth valve 63 open a substantially shorter time than vermouth capacitor 99 and vermouth relay 95, thereby to dispense substantially less vermouth.

Also when relay 173 returns to its FIG. 7 position, the charged gin capacitor 99 begins to discharge through gin relay 95. Gin relay 95 had previously been energized during the time that relay 173 was energized; and now, gin relay 95 is energized for a further period of time, thus prolonging the time during which gin valve 63 is open and increasing the quantity of gin dispensed. In other words, for an extra dry martini, the time that gin valve 63 is open is increased from the discharge time of the gin capacitor 99 by the discharge time of the extra dry martini capacitor 172. The gin discharge time for an extra dry martini is thus the discharge time for gin capacitor 99 plus that for capacitor 172; and these two capacitors discharge one immediately after the other, in the sequence 172–99.

Upon the completion of discharge of gin capacitor 99, an impulse is sent as before, through gin diode 115 to trigger the low speed or stirring motor circuit.

FIGS. 8 and 9 indicate other variant portions of the basic circuit of FIG. 6, which are needed in order to dispense sours and collins. Essentially, the circuits indicated by FIGS. 8 and 9 are similar to the shaken drinks circuit of FIG. 6, except that in effect there is nothing corresponding to diode 115. Thus pressing the "sour" or the "collins" button will send an impulse through the on-winding 159 of the associated latching relay 131 for the sour or the collins, thereby setting up the motor circuit in by-pass relationship to the variable resistor 33, that is, for high speed motor operation. Similarly, "lemon" and "sugar," and also "soda" in the case of a collins, will be dispensed; but at the end of dispensing, nothing corresponding to the impulse through 115 will trigger the motor circuit. However, upon subsequently pushing another button 7, for the alcoholic liquid, that liquid will be dispensed and will be added to the sour or collins mix already in container 19; and thereafter, an impulse will be sent through 115 to complete the motor circuit.

Various other functions of the apparatus will be apparent from a consideration of FIG. 6. For example, the manual mix switch will be seen to complete a circuit through the contacts of the deenergized relay 143 and through motor 77 in by-pass relationship with the variable resistor 33. The manual stir switch, however, on the other hand, energizes relays 121 and 143 to complete a circuit through variable resistor 33 and motor 77.

Also, it will be evident that when reed switch 59 is closed by the proximity of magnet 57 upon the emptying of a bottle, relay 97 will be energized, which will open the circuit to the associated light 176 behind the associated button 7 and also to the lights 176 behind all the mixed drink buttons if the exhausted liquid is an ingredient of any of the designated mixed drinks. It would of course be possible to darken only the mixed drink buttons actually involved, but the circuitry is so complicated that it is preferred to darken all mixed drink buttons or no mixed drink buttons. The light 176 in FIG. 6 may thus represent only a single light or else a bank of lights numbering one more than the number of mixed drink buttons. Also when reed switch 59 closes, air valve 43 is turned to its exhaust position. In its exhaust position, air valve 43 depressurizes the associated empty bottle 9, so that head 13 can be easily raised and the empty bottle removed and a full bottle inserted in its place. Reed switch 59 remains closed and relay 97 remains actuated, so that it is necessary again to open the circuit of air valve 43 to prime the fluid circuit containing the new bottle.

The manual prime switch is shown in the circuit of an individual air valve 43. It will be understood, however, that only one prime switch is provided, on the return from all the air valve circuits.

Similarly, a manual switch 177 is shown is the circuit of an individual counter 31; but it will be understood that a common switch 177 is provided in the return from all the counters 31, so that by operation of a single switch 177, all the counters 31 can be deactivated for adjustment or repair of the machine.

It will thus be understood that the components of the supply means shown best in FIGS. 3, 4 and 5, and the components of the actuator means shown best in FIGS. 6, 7, 8 and 9, which are individual to a single liquid, such as 43, 63, 95, 97, 99, 101, 59, 115 and 31 in FIG. 6, are essentially duplicated for the various liquids and are carried by plates 91; while most of the rest of the components shown in FIG. 6 are common to the various liquids.

As mentioned above, it may be desirable to provide a special adapter for use with bottles which are unusually short. Such an adapter is shown in FIG. 10, in which the head 13' has a stopper 47' and a length of conduit 49' extending therethrough which is disposed within telescoping tubing comprising an inner tube 179 which seals against stopper 47', and an outer tube 181 within which tube 179 slides. A lower stopper 183 is sealed to the bottom of outer tube 181. Conduit 49' passes through stoppers 47' and 183 in sealed relationship, and passageways (not shown) for compressed air also pass through the two stoppers.

Means are provided for sealing tubes 179 and 181 to each other against the loss of pressure, in any extended position thereof, in the form of an elastic deformable gasket 185 which seals against inner tube 179 when clamped between a socket (not shown) within a screw-threaded upper end 187 of outer tube 181, and an opposed socket (not shown) within an internally screw-threaded nut 189 that mates with end 187.

Thus, to provide the adapter in any desired length, it is necessary only to slide the tubes 179 and 181 relative to each other until the desired length is reached. Then nut 189 is screwed down on end 187 to seal the joint between tubes 179 and 181 by means of gasket 185; and after this, the thus adapted head 13' can be used by insertion of stopper 183 in the neck of a short bottle.

In view of the foregoing disclosure, therefore, it will be evident that all of the initially recited objects of the present invention have been achieved.

Although the present invention has been described and illustrated in connection with preferred embodiments, it is to be understood that other modifications and variations may be resorted to without departing from the spirit of the invention, as those skilled in this art will readily understand. Such modifications and variations are considered to be within the purview and scope of the present invention, as defined by the appended claims.

Having described my invention, I claim:

1. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, a plurality of second actuator means each of which is common to a plurality of said supply means and is selectively operable to cause the dispensing of predetermined quantities of the associated plurality of liquids, each said supply means including conduit means connectible with a supply container of liquid, alarm means, means responsive to the disconnection of a said conduit means from its associated supply means prior to depletion of its contents to actuate said alarm means, and means responsive to said depletion to disable the associated said alarm means, whereby a depleted container can be replaced by a full container without actuating said alarm means.

2. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, and a plurality of second actuator means of which is common to a plurality of said supply means and is selectively operable to cause the dispening of predetermined quantities of the associated plurality of liquids, each said supply means including means connectible with a supply container of liquids, said connectible means including indicator means actuable by said actuator means at the onset of dispensing to give a visual indication of the supply containers from which liquid is being dispensed.

3. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, a plurality of second actuator means each of which is common to a plurality of said supply means and is selectively operable to cause the dispensing of predetermined quantities of the associated plurality of liquids, each said supply means including sealing means detachably connectible in fluidtight relationship with the open tops of upright supply containers of the liquid, means mounting said connectible means for vertical reciprocatory motion to permit replacement of supply containers and adaptation to supply containers of different heights, said actuator means and said supply means comprising components individual to each said different liquid and components common to all said different liquids, means mounting said individual components in unitary assembly for vertical movements with said connectible means, said means mounting said individual components comprising a vertically disposed plate, a stationary upright panel, the plate being disposed on one side and the associated said connectible means being disposed on the other side of said panel, and means detachably interconnecting said plate and said connectible means.

4. A dispenser as claimed in claim 3, said plates having opposite vertical side edges and being disposed side by side with their said side edges in sliding contact with those of the adjacent said plates to provide vertical guideways for each other.

5. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, and a plurality of second actuator means each of which is common to a plurality of said supply means and is selectively operable to cause the dispensing of predetermined quantities of the associated plurality of liquids, said supply means comprising a sparate dispensing conduit individual to each of the different liquids, the outlet ends of said conduits being adjacent each other and disposed in a common plane, a single cap movable into said plane for closing off said outlet ends and for isolating said conduits from each other, said actuator means including means for opening and closing said cap before and after the dispensing of liquid.

6. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, a plurality of second actuator means each of which is common to a plurality of said supply means and is selectively operable to cause the dispensing of predetermined quantities of the associated plurality of liquids, each said supply means comprising means connectible with a supply container of the liquid, means for supporting a container upright but tilted, and conduit means extending through said connectible means at the same angle to the vertical as the tilted container but then turning downwardly more toward the vertical and terminating in the lowermost corner of a said tilted container.

7. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, a plurality of second actuator means each of which is common to a plurality of said supply means and is selectively operable to cause the dispensing of predetermined quantities of the associated plurality of liquids, each said supply means comprising means connectible with a supply container of the liquid, supporting means supporting the bottoms of a plurality of said containers at a common height, and adapter means detachably connected to said connectible means to adapt said connectible means to containers of different heights.

8. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, a plurality of second actuator means each of which is common to a plurality of said supply means and is selectively operable to cause the dispensing of pedetermined quantities of the associated plurality of liquids, agitator means responsive to the actuation of a said second actuator means to agitate the dispensed liquids to mix them, and means for selectively postponing operation of said agitator means until after a plurality of operations of said second actuator means.

9. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, and a plurality of second actuator means each of which is common to a plurality of said supply means and is selectively operable to cause the dispensing of pedetermined quantities of the associated plurality of liquids, at least one said second actuator means including means for causing the dispensing from one said supply means of a different quantity of the single associated liquid than is caused to be dispensed by the said first actuator means which is associated with said single liquid, said one supply means including an electrically operated dispensing valve, said one second actuator means including first capacitor means for actuating said valve to dispense the associated liquid, said associated first actuator means including second capacitor means for actuating said valve to dispense the associated liquid, said first and second capacitor means having distinctively different capacities, the actuation of one of said one second actuator means and said associated first actuator means causing the charging and discharging of one only of said first and second capacitor means, the actuation of the other of said one second actuator means and said associated first actuator means causing the charging and the sequential discharging of both said first and second capacitor means.

10. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, a plurality of second actuator means each of which is common to a plurality of said supply means and is selectively operable to cause the dispensing of predetermined quantities of the associated plurality of liquids, each said supply means including sealing means detachably connectible in fluid-tight relationship with the open tops of upright supply containers of the liquid, means mounting said connectible means for vertical reciprocatory motion to permit replacement of supply containers and adaptation to supply containers of different heights, and resilient means continuously yieldably urging said connectible means downwardly.

11. A liquid dispenser comprising a plurality of supply means each of which is individual to one of a plurality of different liquids, a plurality of first actuator means each of which is individual to one of said supply means and is selectively operable to cause the dispensing of a predetermined quantity of the associated liquid, a plurality of second actuator means each of which is common to a plurality of said supply means and is selectively operable to cause the dispensing of predetermined quantities of the associated plurality of liquids, each said supply means including means connectible with a supply container of the liquid, means mounting said connectible means for vertical reciprocatory motion to permit replacement of supply containers and adaptation to supply containers of different heights, and resilient means continuously yieldably urging said connectible means downwardly.

References Cited

UNITED STATES PATENTS

| | | | |
|---|---|---|---|
| 2,919,053 | 12/1959 | Briggs | 222—76 |
| 2,995,158 | 8/1961 | Oberg | 222—124.4 |
| 3,112,844 | 12/1963 | Keller et al. | 222—76 X |
| 3,114,478 | 12/1963 | Hilkenseiler et al. | 222—76 |
| 3,119,485 | 1/1964 | Bayers et al. | 222—129.4 X |
| 3,133,674 | 5/1964 | Schmaus | 222—129.4 X |
| 3,145,741 | 8/1964 | Smith | 222—70 X |
| 3,168,597 | 2/1965 | Nilsen et al. | 222—399 X |
| 3,170,598 | 2/1965 | McPherson | 222—76 X |
| 3,305,132 | 2/1967 | Coja | 222—129.4 X |
| 457,913 | 8/1891 | Fowler | 222—30 |
| 1,003,449 | 9/1911 | Green | 222—377 |
| 2,952,209 | 9/1960 | Scholin | 222—66 X |
| 3,196,802 | 7/1965 | Matheny | 222—325 X |

ROBERT B. REEVES, *Primary Examiner.*

H. S. LANE, *Assistant Examiner.*

U.S. Cl. X.R.

222—39, 70, 76, 129.4, 400.7